(12) United States Patent
Sigmund et al.

(10) Patent No.: US 8,798,241 B2
(45) Date of Patent: Aug. 5, 2014

(54) SECURE VISUAL VOICEMAIL

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 222 days.

(21) Appl. No.: 12/160,946

(22) PCT Filed: May 29, 2008

(86) PCT No.: PCT/US2008/065046
§ 371 (c)(1),
(2), (4) Date: Jul. 15, 2008

(87) PCT Pub. No.: WO2009/029313
PCT Pub. Date: Mar. 5, 2009

(65) Prior Publication Data
US 2010/0195807 A1    Aug. 5, 2010

Related U.S. Application Data

(60) Provisional application No. 60/969,419, filed on Aug. 31, 2007.

(51) Int. Cl.
*H04M 1/64* (2006.01)
(52) U.S. Cl.
USPC ....................................... 379/88.22; 379/67.1
(58) Field of Classification Search
CPC ............ H04M 3/533; H04M 3/42068; H04M 2203/6009; H04M 3/42042; H04M 3/487; H04M 7/0024; H04M 7/006; H04M 15/57; H04L 12/587; H04L 51/04; H04L 51/24; H04L 65/1063; H04L 67/06; H04W 8/18; H04W 68/00
USPC ...................... 379/88.26, 88.12, 88.14, 88.05
See application file for complete search history.

(56) References Cited

U.S. PATENT DOCUMENTS 5,329,579 A   7/1994  Brunson
5,524,137 A   6/1996  Rhee
(Continued)

FOREIGN PATENT DOCUMENTS

EP   0 631 452    12/1994
EP   1 113 631    7/2001
(Continued)

OTHER PUBLICATIONS

U.S. Notice of Allowance dated May 26, 2011 in U.S. Appl. No. 12/201,945.
(Continued)

*Primary Examiner* — Amal Zenati
(74) *Attorney, Agent, or Firm* — Harman & Citrin LLC

(57) ABSTRACT

A method (200) for managing voicemail messages for a visual voicemail system (102) can include establishing a secure data session (212) between a voicemail system (102) and a mobile device (118). The voicemail system (102) can receive a voicemail message (202) that is directed to a voicemail account associated with a voicemail subscriber. The voicemail system (102) can generate a notification message and can send the notification message (208) to the mobile device (118) that is associated with the voicemail account that received the voicemail message. In response to the notification message, the mobile device (102) can generate and send a first request for voicemail message header information (234). The voicemail system (118) can send the requested voicemail message header information (236) to the mobile device (102) and, in response, receive a second request for at least one voicemail message (238). The voicemail message can send at least a portion of the at least one voicemail message (240) to the mobile device (118).

17 Claims, 6 Drawing Sheets

(56) References Cited

U.S. PATENT DOCUMENTS

| | | |
|---|---|---|
| 5,572,578 A | 11/1996 | Lin et al. |
| 5,737,394 A | 4/1998 | Anderson et al. |
| 5,737,395 A | 4/1998 | Irribarren |
| 5,809,111 A | 9/1998 | Matthews |
| 6,005,870 A | 12/1999 | Leung et al. |
| 6,108,559 A | 8/2000 | Astrom et al. |
| 6,148,212 A | 11/2000 | Park et al. |
| 6,246,871 B1 | 6/2001 | Ala-Laurila |
| 6,335,962 B1 | 1/2002 | Ali et al. |
| 6,351,523 B1 | 2/2002 | Detlef |
| 6,360,272 B1 | 3/2002 | Lincke et al. |
| 6,480,885 B1 | 11/2002 | Olivier |
| 6,522,727 B1 | 2/2003 | Jones |
| 6,615,036 B1 | 9/2003 | Haas et al. |
| 6,751,298 B2 | 6/2004 | Bhogal et al. |
| 6,829,334 B1 | 12/2004 | Zirngibl |
| 6,868,143 B1 | 3/2005 | Menon et al. |
| 6,879,847 B1 | 4/2005 | Kato |
| 6,912,275 B1 | 6/2005 | Kaplan |
| 6,937,868 B2 | 8/2005 | Himmel et al. |
| 6,981,023 B1 | 12/2005 | Hamilton et al. |
| 7,095,828 B1 | 8/2006 | Elliot et al. |
| 7,142,648 B1 | 11/2006 | Miller |
| 7,171,186 B2 | 1/2007 | Miyachi et al. |
| 7,248,857 B1 * | 7/2007 | Richardson et al. .......... 455/413 |
| 7,277,529 B1 | 10/2007 | Wuthnow et al. |
| 7,283,809 B1 | 10/2007 | Weinman |
| 7,369,648 B1 | 5/2008 | Chang |
| 7,680,491 B2 | 3/2010 | Zabawskyj et al. |
| 7,738,833 B2 | 6/2010 | Bettis et al. |
| 7,796,977 B2 | 9/2010 | Vander Veen |
| 7,826,831 B2 | 11/2010 | Bettis et al. |
| 7,894,580 B2 | 2/2011 | Veen et al. |
| 8,320,535 B2 | 11/2012 | Alperin et al. |
| 8,644,463 B2 | 2/2014 | Demmitt et al. |
| 2002/0015403 A1 | 2/2002 | McConnell et al. |
| 2002/0037075 A1 | 3/2002 | Flanagan |
| 2002/0049768 A1 | 4/2002 | Peek et al. |
| 2002/0077098 A1 | 6/2002 | Tiliks et al. |
| 2002/0112007 A1 | 8/2002 | Wood et al. |
| 2002/0115429 A1 | 8/2002 | Deluca et al. |
| 2003/0091169 A1 | 5/2003 | Cain |
| 2003/0099341 A1 | 5/2003 | Williams |
| 2003/0220784 A1 | 11/2003 | Fellenstein et al. |
| 2004/0023643 A1 | 2/2004 | Vander Veen et al. |
| 2004/0081088 A1 | 4/2004 | Schinner et al. |
| 2004/0139471 A1 | 7/2004 | Geen et al. |
| 2004/0146147 A1 | 7/2004 | Picard et al. |
| 2004/0248594 A1 | 12/2004 | Wren |
| 2004/0252679 A1 | 12/2004 | Williams et al. |
| 2004/0264658 A1 | 12/2004 | Cline et al. |
| 2005/0059384 A1 | 3/2005 | Kuusinen et al. |
| 2005/0089149 A1 | 4/2005 | Elias |
| 2005/0102368 A1 | 5/2005 | Forman et al. |
| 2005/0113078 A1 | 5/2005 | Deitrich |
| 2005/0186944 A1 | 8/2005 | True et al. |
| 2005/0213715 A1 | 9/2005 | Winick |
| 2006/0003745 A1 | 1/2006 | Gogic |
| 2006/0025114 A1 | 2/2006 | Bales et al. |
| 2006/0025140 A1 | 2/2006 | Bales et al. |
| 2006/0031470 A1 | 2/2006 | Chen et al. |
| 2006/0059361 A1 | 3/2006 | Paden |
| 2006/0062356 A1 | 3/2006 | Vendrow |
| 2006/0171511 A1 | 8/2006 | Liu et al. |
| 2006/0173959 A1 | 8/2006 | McKelvie et al. |
| 2006/0239419 A1 | 10/2006 | Joseph et al. |
| 2006/0251222 A1 | 11/2006 | Abramson et al. |
| 2006/0253584 A1 | 11/2006 | Dixon et al. |
| 2006/0281443 A1 | 12/2006 | Chen et al. |
| 2007/0038483 A1 | 2/2007 | Wood |
| 2007/0066284 A1 | 3/2007 | Gatzke et al. |
| 2007/0127632 A1 | 6/2007 | Swingle et al. |
| 2007/0127663 A1 | 6/2007 | Bae |
| 2007/0140443 A1 | 6/2007 | Woodring |
| 2007/0143106 A1 | 6/2007 | Dunsmuir |
| 2007/0173233 A1 | 7/2007 | Vander Veen et al. |
| 2007/0180032 A1 | 8/2007 | Pearson |
| 2007/0180504 A1 | 8/2007 | Hung |
| 2007/0207785 A1 | 9/2007 | Chatterjee et al. |
| 2007/0213050 A1 | 9/2007 | Jiang |
| 2007/0223666 A1 | 9/2007 | Teague |
| 2007/0239833 A1 | 10/2007 | Alperin et al. |
| 2007/0287453 A1 | 12/2007 | Wang |
| 2008/0008163 A1 | 1/2008 | Castell et al. |
| 2008/0008299 A1 | 1/2008 | Didcock et al. |
| 2008/0056459 A1 | 3/2008 | Vallier et al. |
| 2008/0062246 A1 | 3/2008 | Woodworth et al. |
| 2008/0062938 A1 | 3/2008 | Gil-soo et al. |
| 2008/0081609 A1 | 4/2008 | Burgan et al. |
| 2008/0140767 A1 | 6/2008 | Rao et al. |
| 2008/0167007 A1 | 7/2008 | Novick et al. |
| 2008/0167010 A1 | 7/2008 | Novick et al. |
| 2008/0167014 A1 | 7/2008 | Novick et al. |
| 2008/0188204 A1 | 8/2008 | Gavner |
| 2008/0200152 A1 | 8/2008 | Moore |
| 2008/0207176 A1 | 8/2008 | Brackbill et al. |
| 2008/0243513 A1 | 10/2008 | Bucchieri et al. |
| 2008/0260118 A1 | 10/2008 | Lyle |
| 2008/0298459 A1 | 12/2008 | Yang et al. |
| 2008/0300873 A1 * | 12/2008 | Siminoff ...................... 704/235 |
| 2009/0149220 A1 | 6/2009 | Camilleri et al. |
| 2009/0239507 A1 | 9/2009 | Sigmund et al. |
| 2009/0253407 A1 | 10/2009 | Sigmund et al. |
| 2009/0253412 A1 | 10/2009 | Sigmund et al. |
| 2009/0253413 A1 | 10/2009 | Sigmund et al. |
| 2010/0159886 A1 | 6/2010 | Sigmund et al. |
| 2010/0159888 A1 | 6/2010 | Sigmund et al. |
| 2010/0159889 A1 | 6/2010 | Sigmund et al. |
| 2010/0159890 A1 | 6/2010 | Sigmund et al. |
| 2010/0159891 A1 | 6/2010 | Sigmund et al. |
| 2010/0166161 A1 | 7/2010 | Dhawan et al. |
| 2010/0167699 A1 | 7/2010 | Sigmund et al. |
| 2010/0189229 A1 | 7/2010 | Sigmund et al. |
| 2010/0222024 A1 | 9/2010 | Sigmund et al. |
| 2011/0085646 A1 | 4/2011 | Sigmund et al. |
| 2013/0010937 A1 | 1/2013 | Sigmund et al. |
| 2013/0012173 A1 | 1/2013 | Sigmund et al. |
| 2013/0040614 A1 | 2/2013 | Sigmund et al. |

FOREIGN PATENT DOCUMENTS

| | | |
|---|---|---|
| EP | 1 434 415 | 6/2004 |
| EP | 1 599 022 | 11/2005 |
| KR | 2005 0001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Sep. 19, 2011 in U.S. Appl. No. 12/477,971.
U.S. Official Action dated Apr. 25, 2012 in U.S. Appl. No. 12/477,971.
U.S. Official Action dated Oct. 13, 2011 in U.S. Appl. No. 12/485,335.
U.S. Official Action dated May 22, 2012 in U.S. Appl. No. 12/485,335.

(56) References Cited

OTHER PUBLICATIONS

U.S. Official Action dated Apr. 27, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Notice of Allowance dated Jun. 21, 2012 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Office Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
Office Action mailed on Aug. 16, 2013 in U.S. Appl. No. 13/654,480.
Office Action mailed on Jun. 4, 2013 in U.S. Appl. No. 13/785,710.
Notice of Allowance mailed on Dec. 30, 2013 in U.S. Appl. No. 12/160,931.
Office Action mailed Jan. 21, 2014 in U.S. Appl. No. 13/654,480.
Office Action mailed Oct. 22, 2013 in U.S. Appl. No. 13/930,210.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Aug. 30, 2012 in U.S. Appl. No. 12/160,931.
U.S. Office Action dated Jul. 30, 2012 in U.S. Appl. No. 12/161,027.
U.S. Notice of Allowance dated Nov. 16, 2012 in U.S. Appl. No. 12/161,027.
U.S. Office Action dated Sep. 14, 2012 in U.S. Appl. No. 12/161,064.
U.S. Notice of Allowance dated Oct. 25, 2012 in U.S. Appl. No. 12/160,940.
U.S. Notice of Allowance dated Nov. 23, 2012 in U.S. Appl. No. 12/485,335.
U.S. Notice of Allowance dated Nov. 21, 2012 in U.S. Appl. No. 12/477,971.
U.S. Notice of Allowance dated Dec. 27, 2012 in U.S. Appl. No. 13/616,198.
U.S. Notice of Allowance dated Feb. 28, 2013 in U.S. Appl. No. 12/161,064.
U.S. Office Action dated Feb. 28, 2013 in U.S. Appl. No. 13/654,480.
U.S. Appl. No. 13/751,505, filed Jan. 28, 2013 to Sigmund et al.
U.S. Appl. No. 13/785,710, filed Mar. 5, 2013 to Sigmund et al.
U.S. Notice of Allowance dated Jan. 31, 2013 in U.S. Appl. No. 12/485,961.
Office Action mailed Jun. 18, 2014 in U.S. Appl. No. 13/613,525.

\* cited by examiner

SECURE VISUAL VOICEMAIL

RELATED APPLICATION

This application claims priority to U.S. Provisional Patent Application No. 60/969,419, filed Aug. 31, 2007, the entirety of which is hereby incorporated by reference.

TECHNICAL FIELD

The present disclosure relates generally to voicemail service and, more particularly, to a secure visual voicemail service.

BACKGROUND

Voicemail systems allow a caller to leave a voice message if the desired recipient is unavailable. Traditional voicemail systems (referred to herein as plain old voicemail or POVM) allow a subscriber to place a call to a voicemail system to access messages stored in his or her voicemail box. This is often done through a telephone user interface (TUI) that facilitates interaction between the subscriber and the voicemail system. The TUI provides functions for the subscriber to listen to messages, skip messages, delete messages, and save messages. The TUI can also provide functions for the subscriber to set a voicemail greeting, record a voicemail greeting, record a name, and set/change a password.

With some voicemail systems, a subscriber with multiple voicemail messages is required to listen to, skip, delete, or save each message while reviewing the voicemail box. This is time consuming and can be frustrating for the subscriber in situations where an important message has been deposited, requiring the subscriber to listen to, skip, delete or save each message in search of the important message.

To help reduce the need to search through multiple messages, various improved voicemail systems have been developed that allow messages to be stored based on a priority scheme to increase the efficiency of listening to voicemail messages. Often, these systems use a telephone number of the caller to identify a priority for a message and position the voicemail messages in order based on the assigned priorities. When the recipient accesses the voicemail system to acquire voicemail messages, the recipient is presented with each voicemail message in order of the priority or importance to the recipient. Accordingly, the recipient is must listen to and/or skip through multiple voicemail messages to find an important message. However, an important message can be easily relegated to a position of low importance if the subscriber previously has not set the priority for the caller. In this system, the priority for an incoming voicemail message is determined directly by the telephone number associated with the caller.

The aforementioned systems fail to allow a subscriber to select the exact voicemail message the subscriber would like to hear. Furthermore, the aforementioned systems require the use of a TUI to access the voicemail system to listen to voicemail messages and manage a voicemail account. These systems merely notify a subscriber of a pending voicemail message with a message waiting indicator (MWI) and require that the subscriber access the voicemail system to retrieve the pending message(s). Thus, it is desirable to create new enhanced voicemail systems and novel methods for providing secure visual voicemail (VVM) services.

SUMMARY

A method for managing incoming voicemail messages for a visual voicemail system can include establishing a secure data session between a voicemail system and a mobile device, receiving a new voicemail message at the voicemail system, wherein the new voicemail message is directed to a voicemail account associated with a voicemail subscriber, generating a notification message in response to the new voicemail message, sending the notification message to the mobile device associated with the voicemail account that received the new voicemail message, receiving a first request for voicemail message header information in response to the notification message, sending the requested voicemail message header information to the mobile device in response to the first request, receiving a second request for at least one voicemail message, and sending the at least one voicemail message to the mobile device in response to the second request. Establishing the secure data session between the voicemail system and the mobile device can include establishing a secure sockets layer (SSL) data session or a transport layer security (TLS) data session, for example.

A method for setting or changing a voicemail greeting for visual voicemail service can include establishing a secure data session between a voicemail system and a mobile device, receiving a request from the mobile device to change a voicemail greeting, wherein the request can include a new voicemail greeting recorded on the mobile device, and saving the new voicemail greeting at the voicemail system. The method can further include generating a response indicating the success or failure of the request, and sending the response to the mobile device. Establishing the secure data session between the voicemail system and the mobile device can include establishing a secure sockets layer (SSL) data session or a transport layer security (TLS) data session, for example.

A method for changing a password for accessing visual voicemail service can include establishing a secure data session between a voicemail system and a mobile device, receiving a request from the mobile device to change a voicemail password, wherein the request can include an old password and a new password entered on the mobile device, and saving the new password, thereby replacing the old password. The method can further include generating a response indicating the success or failure of the request, and sending the response to the mobile device. Establishing the secure data session between the voicemail system and the mobile device can include establishing a secure sockets layer (SSL) data session or a transport layer security (TLS) data session, for example.

A method for setting or changing a recorded name for a visual voicemail service can include establishing a secure data session between a voicemail system and a mobile device, receiving a request from the mobile device to change a recorded name, wherein the request can include a new recorded name recorded on the mobile device, and saving the new recorded name, thereby replacing an old recorded name. The method can further include generating a response indicating the success or failure of the request, and sending the response to the mobile device. Establishing the secure data session between the voicemail system and the mobile device can include establishing a secure sockets layer (SSL) data session or a transport layer security (TLS) data session, for example.

A method for managing voicemails from a mobile device can include establishing a secure data session between a mobile device and a voicemail system, receiving a notification message identifying that at least one new voicemail message has been deposited into a voicemail account associated with the mobile device, generating a first request for voicemail header information from the voicemail system, sending the first request to the voicemail system, receiving, in response to the first request, the requested voicemail message header information, generating a second request for at least one voicemail message identified in the requested voicemail message header information, sending the second request to the voicemail system, and receiving, in response to the second request, the requested at least one voicemail message. The method can further include saving the at least one voicemail message at least temporarily in a memory of the mobile device. Establishing the secure data session between the voicemail system and the mobile device can include establishing a secure sockets layer (SSL) data session or a transport layer security (TLS) data session, for example. Establishing the secure data session between the voicemail system and the mobile device can include establishing a secure sockets layer (SSL) data session or a transport layer security (TLS) data session, for example.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
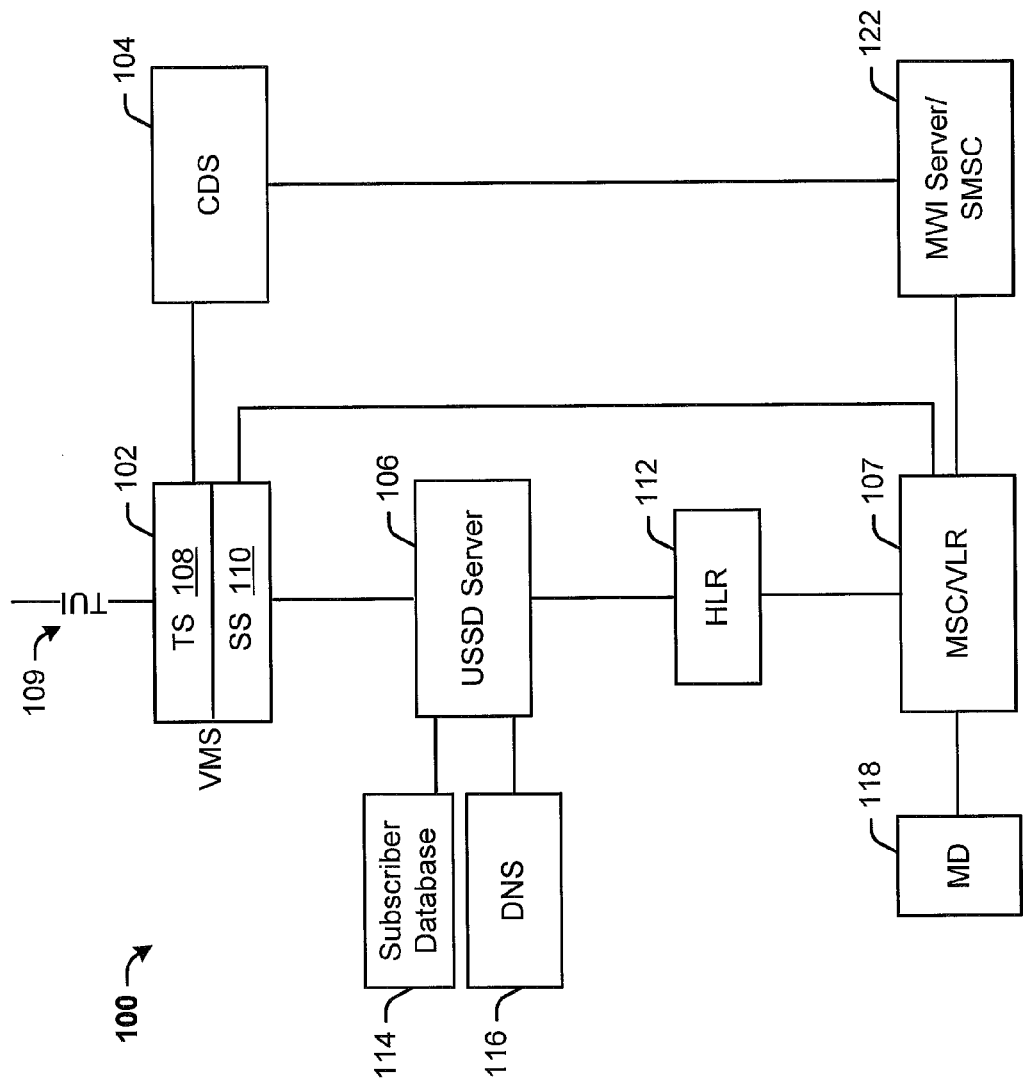
FIG. 1 illustrates a portion of an exemplary network in which aspects of the present disclosure can be practiced.

Referring now to the drawings wherein like numerals represent like elements throughout the several views, FIG. 1 schematically illustrates a portion of an exemplary wireless communications network 100 in which some embodiments of the present disclosure can be implemented. By way of example, the wireless communications network 100 can be configured as a 2G GSM (Global System for Mobile communications) network and can provide data communications via GPRS (General Packet Radio Service), and EDGE (Enhanced Data rates for GSM Evolution). By way of further example, the wireless communications network 100 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 100 is also compatible with future mobile communications standards including, but not limited to, pre-4G and 4G, for example. The wireless communications network 100 can be configured to provide messaging services via Short Message Service (SMS), Multimedia Message Service (MMS), instant messaging and unstructured supplementary service data (USSD), for example. The wireless communications network 100 can also be configured to provide advanced voicemail messaging features, such as visual voicemail.

The illustrated wireless communications network 100 includes a voicemail system (VMS) 102 that is illustrated as being in communication with a content delivery server (CDS) 104, a USSD server 106, and a mobile switching center (MSC) and visiting location register (VLR) 107, although this is not necessarily the case. The VMS 102 can include a telephony server (TS) 108 for handling incoming voicemail inquiries via a telephone user interface (TUI) 109 and a storage server (SS) 110 for storing and managing voicemail messages for a plurality of voicemail accounts.

The USSD server 106 can be configured to receive, decode, and process new USSD messages, perform database queries to retrieve the VMS hostname serving a subscriber, perform database queries to resolve the VMS hostname to the corresponding IP address, obtain the subscriber's voicemail class of service (COS), and send the subscriber's voicemail COS to the subscriber's mobile device. The USSD server 106 is illustrated as being in communication with a home location register (HLR) 112, a subscriber database 114, and a domain name server (DNS) 116 to facilitate these functions.

The subscriber database 114 can be configured to store and manage subscriber data, such as, for example, account information, billing information, services information, and equipment information for a plurality of subscribers. The DNS server 116 can be configured to maintain a database for resolving host names and IP addresses for various network nodes, such as the VMS 102, for example. The USSD server 106 can retrieve the VMS hostname serving a subscriber from the subscriber database 114 and query the DNS 116 by specifying the VMS hostname to resolve the corresponding IP address.

The HLR 112 can be configured to provide routing information for mobile-terminated calls and short message service (SMS) messages. The HLR 112 is illustrated as being in communication with the MSC/VLR 107. The MSC/VLR 107 is in communication with a MD 118 and a short message service center (SMSC) 122. The MD 118 can be, but is not limited to, a user equipment, a mobile terminal, a cellular telephone, a personal digital assistant (PDA), a handheld computer, or combinations thereof, and the like. The SMSC 122 can be configured to deliver SMS messages and message waiting indicator (MWI) messages.

The VMS 102 can be configured to store a plurality of voicemail accounts. Each voicemail account can include a voicemail box in which voicemail messages can be deposited for a subscriber. The number of voicemail messages capable of being stored per account can be determined by the voicemail service provider or any third party provider, such as the system manufacturer, for example. The maximum voicemail message length can also be set, if desired. The number of voicemail messages and the maximum voicemail message length can be configured on the VMS 102.

Prior to a subscriber being provisioned for visual voicemail service, the voicemail box is in a not provisioned state. After being provisioned for visual voicemail service, the subscriber's voicemail box state is changed to provisioned—not initialized to reflect that the subscriber is provisioned for service but has not yet initialized service via a boot message process that is described below. After completion of the boot message process, the VMS 102 state can be changed to provisioned—initialized to reflect that the subscriber is provisioned for voicemail service and has completed the first boot access process.

The VMS 102 is accessible via traditional or plain old voicemail (POVM) methods and visual voicemail (VVM) methods described herein. State changes to voicemail messages, whether requested through the TUI 109 via POVM methods or directly on the MD 118 via VVM methods, are automatically updated in both the voicemail box and on the subscriber's MD 118. This ensures automatic and full synchronization between the subscriber's MD 118 and the VMS 102 so that the latest voicemail information is stored on the subscriber's MD 118. The subscriber's VMS-hosted voicemail box recognizes and maintains message states for each message, such as, but not limited to, an unheard—new state, a skipped state, and a saved—read state. Deleted messages can be deleted from the VMS 102, via the TUI 109 or directly on the MD 118. The message is deleted on both the VMS 102 and the MD 118. Alternatively, a message can remain accessible on the MD 118 and/or on the VMS 102 for a specified period of time to allow the message to be recovered in the case of accidental or premature deletion. The VMS 102 can discard all messages after the MD 118 has successfully received and stored the available message content.

The MD 118 voicemail box also can recognize and maintain message states. The MD 118 voicemail box can have message states for each message including, but not limited to, an unheard—new state, a saved read state, and a deleted state. The MD 118 does not require a skipped state because VVM provides an interface that allows a subscriber to access any message regardless of the order in which the message was received and is not subject to restraint of a priority scheme. As mentioned above, the MD 118 voicemail box deleted state can be configured such that the message is available for recovery or merely as an indication that the message has been deleted. Either of these options can be set to be available for a time specified by either the subscriber via a device input or by the voicemail service provider.

Messages used to establish and/or update a VVM account can be sent using a variety of protocols, such as, but not limited to, short message peer-to-peer (SMPP), domain name server (DNS) protocol, lightweight directory access protocol (LDAP), unstructured supplementary service data (USSD) protocol, Internet message access protocol version 4 (IMAP4), and hypertext transfer protocol (HTTP), HTTP over secure socket layer (HTTPS), for example. Moreover, protocols to provide or enhance the security of data transmission to and from the various nodes described above can be provided via cryptographic protocols, such as, but not limited to, transport layer security (TLS), secure sockets layer (SSL), improvements, versions, variations, or evolutions thereof, and the like. The description provided below assumes an understanding of these protocols and as such further explanation is not provided. The use of alternative protocols or additional protocols to acquire similar results is deemed to be within the scope of the present disclosure and the attached claims.

A first boot process can enable a subscriber to receive confirmation that VVM service is enabled and is immediately accessible via a VVM application on the MD 118. A visual prompt can be presented to the subscriber as a cue or reminder to setup a voicemail box prior to receipt of incoming voice messages. Conventional voicemail, in contrast, can block receipt of new messages until the mailbox is set up, or can notify the subscriber of the first new voice messages thereby prompting the subscriber to place a call to retrieve them, but can bar access to those messages until the subscriber sets up the mailbox. The visual prompt of the present disclosure advantageously can eliminate the need to access the voicemail system 102 via the TUI 109 to setup the voicemail box and can help to ensure that the subscriber sets up a voicemail box. The notification message also can be used to reset a voicemail password after a voicemail account is enabled.

The VVM service uses several parameters to enable automatic synchronization between the MD 118 and the VMS 102. For example, prior to first boot, the MD 118 does not have the CDS ID, port number, mailbox ID, initial or reset password, and a token value, if applicable. Accordingly, an initial or first boot SMPP message can include a basic set of parameters for future synchronization sessions including a default password. If a subscriber forgets the password or otherwise needs to have the voicemail password reset, the subscriber can initiate a password reset by selecting a password reset option on the MD 118. In this example, a new boot message can be sent to the MD 118 including a new default password in response to a password reset request from the MD 118.

Figure 2:
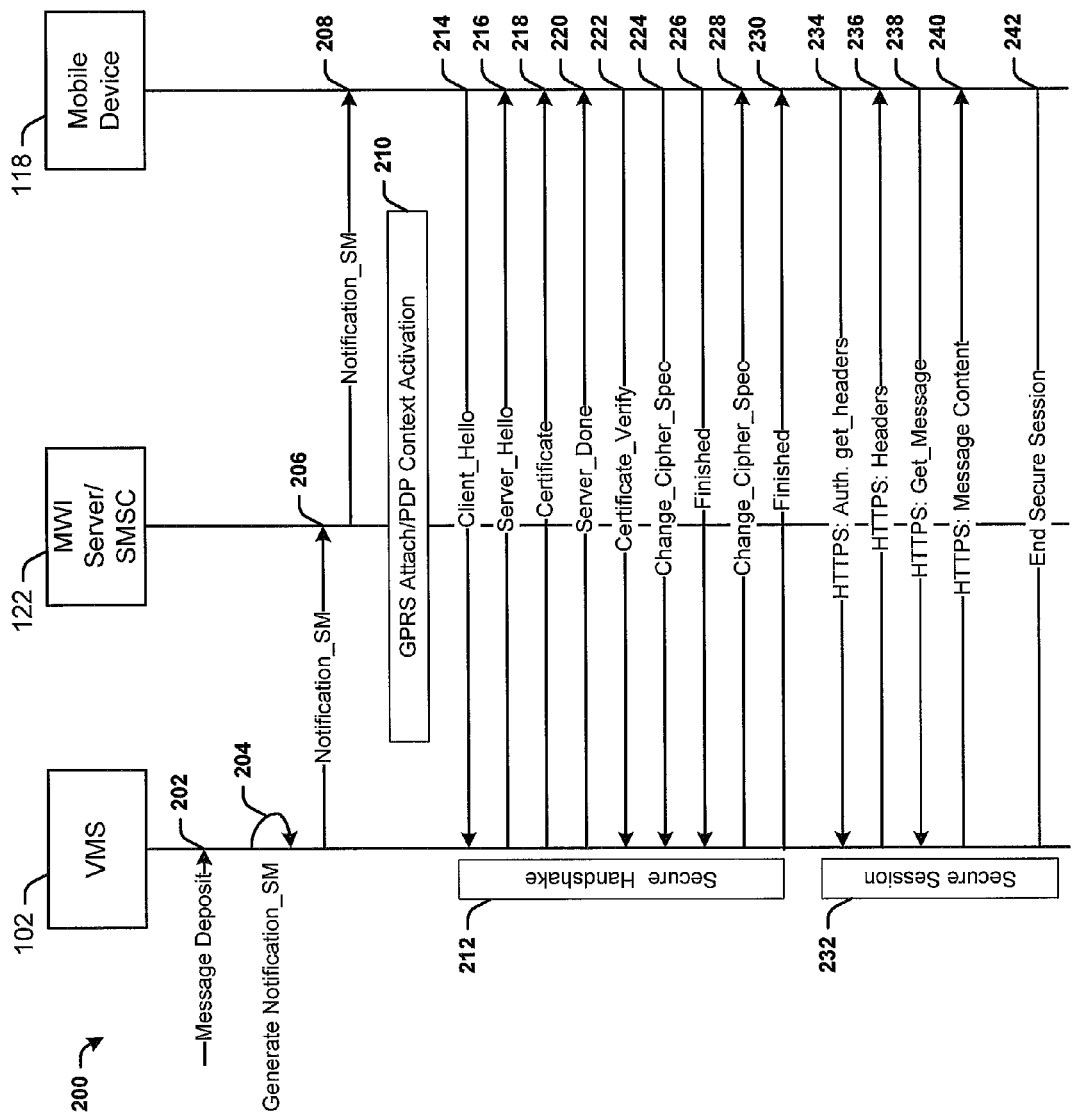
FIG. 2 is a message flow diagram illustrating a process for voicemail message deposit and subsequent secure retrieval of message content for local storage on a mobile device, according to an exemplary embodiment present disclosure.

Referring now to FIG. 2, a flow diagram illustrating a process 200 for voicemail message deposit and subsequent secure retrieval of message content for local storage on a mobile device 118 is illustrated, according to an exemplary embodiment of the present disclosure. It should be understood that the steps of the process 200 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 200 can be ended at any time. Some or all steps of this process, and/or substantially equivalent steps, can be performed by execution of computer-readable instructions included on a computer readable medium.

The process 200 is illustrated as including the VMS 102, the SMSC 122, and the MD 118. In the illustrated process 200, various messages and/or commands are exchanged among these network elements using various protocols, such as, for example, SMPP and HTTPS, although other protocols are contemplated as described above. The process 200 can be modified to include other network elements, such as the CDS 104. In one embodiment, CDS 104 acts in an intermediary capacity, facilitating communication between the MD 118 and the VMS 102. The CDS 104 can communicate with the VMS 102 via the IMAP protocol, for example.

The process 200 begins, at step 202, when a message is deposited into a voicemail box established at the VMS 102. At step 204, the VMS 102 can generate a notification short message (notification_sm) and send the notification_sm to the SMSC 122, at step 206. The SMSC 122 can temporarily store and forward the notification_sm message to the MD 118, at step 208.

The MD 118 can attach to a data network, for example, by a GPRS attach process and can perform a PDP context activation to connect to the data network via an access point name (APN) provided to the MD 118 by the service provider. The APN can be included in the notification_sm message, in a first boot message, or other communication between the MD 118 and the VMS 102 or other network elements, such as the CDS 104, a serving GPRS support node (SGSN), or a gateway GPRS support node (GGSN), for example. Accordingly, a GPRS attach and PDP context activation process 210 is illustrated. The MD 118 can perform these functions as is known in the art at any time prior to activating a secure handshake process 212. The handshake process 212 can be a handshake process of a cryptographic protocol, such as, but not limited to, SSL or TLS.

The illustrated secure handshake process 212 establishes the MD 118 as the client and the VMS 102 as the server, although this is not necessarily the case. As such, references to client refer to the MD 118 and references to server refer to the VMS 102 in the illustrated embodiment and description thereof. The secure handshake process 212 begins when the MD 118 generates and sends a client_hello command to the VMS 102, at step 214. The client_hello command can include the version(s) of SSL or TLS that is supported by the MD 118, the cipher(s) supported by the MD 118 sorted in order of preference, the data compression algorithm(s) that is supported by the MD 118, and a session ID. The client_hello command can also include random data that is generated by the MD 118 for use in a key generation process.

At step 216, the VMS 102 receives the client_hello command and, in response, generates and sends a server_hello command to the MD 118. The server_hello command can include the SSL or TLS version that will be used for the secure session, the cipher that will be used for the secure session, the session ID, and, if applicable, the compression algorithm that will be used for the secure session. The server_hello command can also include random data that is generated by the VMS 102 for use in a key generation process.

At step 218, the VMS 102 can generate and send a certificate command to the MD 118. The certificate command can include a public key and an authentication signature. In addition, the certificate command can include a chain of certificates beginning with the certificate of the certificate authority that assigned the server's certificate.

At step 220, the VMS 102 can generate and send a server_done command to the MD 118 to indicate that the VMS 102 has completed this phase of the secure handshake process 212. If the MD 102 will be authenticated to the VMS 102, additional commands can flow between the MD 118 and the VMS 102. For example, the MD 118 can provide a certificate to authenticate to the VMS 102. This certificate can be sent, for example, in the first boot message, or other communication.

At step 222, the MD 118 can verify the server's certificate and can generate and send a certificate_verify command to the VMS 102 to inform the VMS 102 that the MD 118 has verified the certificate. Likewise, the VMS 102 can verify a client certificate, should one be used, and can generate and send a similar certificate_verify command to the MD 118 to inform the MD 118 that the VMS 102 has verified the certificate.

At step 224, the MD 118 can generate and send a change_cipher_spec command to convey to the VMS 102 that the contents of subsequent SSL transmissions sent by the MD 118 will be encrypted. At step 226, the MD 118 can generate and send a finished command to the VMS 102. The finished command can include a list of all secure handshake commands exchanged between the MD 118 and the VMS 102 to validate that none of the unencrypted commands sent to establish a secure session were changed.

At step 228, the VMS 102 can generate and send a change_cipher_spec command to convey to the MD 118 that the contents of subsequent SSL transmissions sent by the VMS 102 will be encrypted. At step 230, the VMS 102 can then generate and send a finished command. The finished command can include a list of all secure handshake commands exchanged between the VMS 102 and MD 118 to validate that none of the unencrypted commands sent to establish a secure session were changed. A secure session 232 is now established. HTTPS is described as the protocol used to send the various commands between the VMS 102 and the MD 118 in the secure session 232, although other secure protocols are contemplated, as described above.

The secure session 232 can begin when the MD 118 generates and sends a get_headers command to the VMS 102, at step 234. The get_headers command can include parameters, such as, but not limited to, the date, time, and calling line identity (CLI). The get_headers message can additionally include authentication information. At step 236, the VMS 102 retrieves the voicemail message headers for the voicemail account associated with the MD 118 and sends the headers to the MD 118. The MD 118 uses the headers to determine the status of each voicemail message stored on the MD 118 and to identify any new voicemail messages in the subscriber's voicemail account. After the MD 118 determines which message(s) needs to be retrieved, if any, the MD 118 can generate and send a get_message command with the header information for at least one requested message, at step 238. At step 240, the VMS 102 receives the get_message command and sends the requested message content to the MD 118. The secure session 232 can end at step 242.

The MD 118 can receive the message content and store the content under the appropriate header in a memory and permit a subscriber to access the content via a VVM application graphical user interface (GUI). The message content can be formatted using any audio codec, such as, but not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4), Windows® media audio (WMA), RealAudio (RA), free lossless audio codec (FLAC), Apple® lossless encoder (ALE), i.e., Apple® lossless audio codec (ALAC), and other open and proprietary audio formats.

An if-modified-since command can be used to occasionally poll the VMS 102 for an inbox voicemail message list and update any voicemail message if the voicemail was modified since the last update, for example, if a message was deleted or added. This can help reduce the amount of data traversing the network thereby reducing network congestion. In some instances, however, the header information is relatively small and as such no noticeable improvement may be available for sending only the modified voicemail message header.

More than one connection can be established to the VMS 102 or in some cases to multiple or redundant VMSs. This can allow for simultaneous requests in order to serve a subscriber's request to view or listen to a message faster. Load balancing techniques can also be implemented.

Message downloads that are interrupted, via cancellation or connection failure, can be resumed starting at the last received byte, for example. This assumes the message is stored in full, at least temporarily, on the VMS 102. In some instances, however, the VMS 102 can delete the message after the message content is sent to the MD 118. A subsequent request for one or more previously sent messages can be facilitated by re-retrieving the message, re-transcoding the message, and sending the message to the MD 118.

Requests to the VMS 102 can be pipelined in accordance with HTTP 1.1 specifications. This can help reduce network latency for multiple requests.

Figure 3:
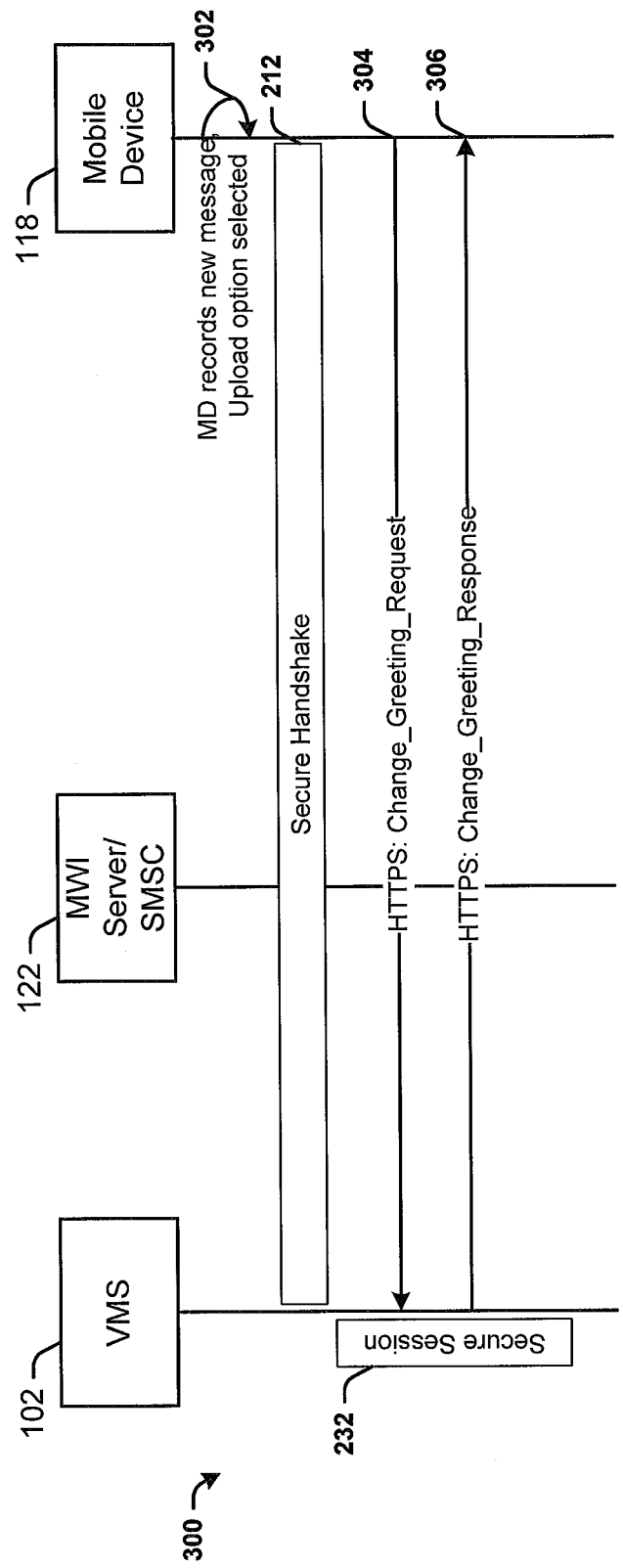
FIG. 3 is a message flow diagram illustrating a secure process for setting or changing a voicemail greeting, according to an exemplary embodiment of the present disclosure.

Referring now to FIG. 3, a flow diagram illustrating a secure process 300 for setting or changing a voicemail greeting is illustrated, according to an exemplary embodiment of the present disclosure. It should be understood that the steps of the process 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 300 can be ended at any time. Some or all steps of this process, and/or substantially equivalent steps, can be performed by execution of computer-readable instructions included on a computer readable medium.

The process 300 is illustrated as including the VMS 102, the SMSC 122, and the MD 118. In the illustrated process 300, various messages and/or commands are exchanged among these network elements using various protocols, such as, for example, HTTPS, although other protocols are contemplated as described above. The process 300 can be modified to include other network elements, such as the CDS 104. In one embodiment, the CDS 104 acts in an intermediary capacity, facilitating communication between the MD 118 and the VMS 102. The CDS 104 can communicate with the VMS 102 via the IMAP protocol, for example.

The illustrated process 300 begins at step 302, wherein the MD 118 records a new voicemail greeting, such as, for example, a voicemail greeting dictated by a subscriber. The subscriber can select an upload function on the VVM application to upload the new greeting. The greeting can be formatted using any audio codec, such as, but not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4), Windows® media audio (WMA), RealAudio (RA), free lossless audio codec (FLAC), Apple® lossless encoder (ALE), i.e., Apple® lossless audio codec (ALAC), and other open and proprietary audio formats.

The MD 118 can establish a secure session using, for example, SSL or TLS, via a secure handshake process 212, as described in FIG. 2. At step 304, the MD 118 can generate and send a change_greeting_request to the VMS 102 via HTTPS, for example. The change_greeting_request can include the recorded greeting in one or more formats. The change_greeting_request can be sent to the VMS 102. The VMS 102 can save the recording as the active or primary voicemail greeting for the subscriber. If a custom voicemail greeting is not set, a default voicemail greeting (e.g., a network default greeting) can be replaced with the new voicemail greeting. At step 306, the success or failure of the save can be reported back to the MD 118 via a change_greeting_response. If the change_greeting_request fails, the VVM application can notify the subscriber to retry, offer customer support, and/or refer the subscriber to a telephone number or website address for further information and troubleshooting.

Figure 4:
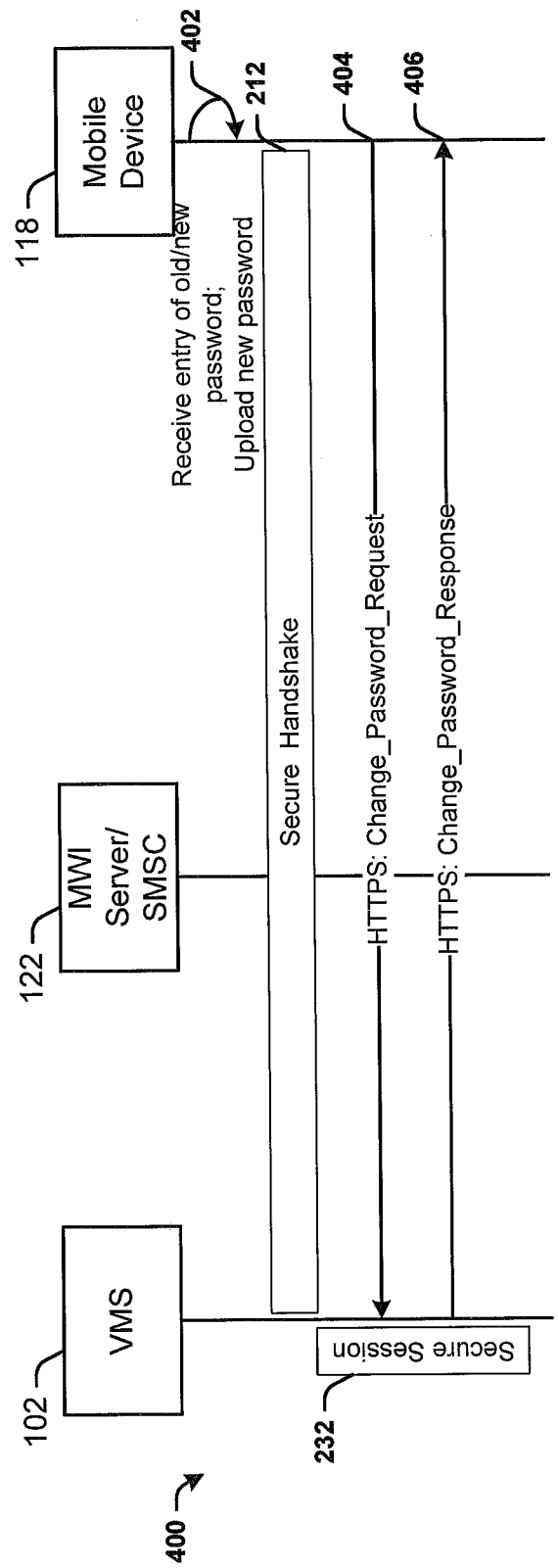
FIG. 4 is a message flow diagram illustrating a secure process for setting or changing a voicemail password, according to an exemplary embodiment of the present disclosure.

Referring now to FIG. 4, a message flow diagram illustrating a secure process 400 for setting or changing a voicemail password is illustrated, according to an exemplary embodiment of the present disclosure. It should be understood that the steps of the process 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 400 can be ended at any time. Some or all steps of this process, and/or substantially equivalent steps, can be performed by execution of computer-readable instructions included on a computer readable medium.

The process 400 is illustrated as including the VMS 102, the SMSC 122, and the MD 118. In the illustrated process 400, various messages and/or commands are exchanged among these network elements using various protocols, such as, for example, HTTPS, although other protocols are contemplated as described above. The process 400 can be modified to include other network elements, such as the CDS 104. In one embodiment, the CDS 104 acts in an intermediary capacity, facilitating communication between the MD 118 and the VMS 102. The CDS 104 can communicate with the VMS 102 via the IMAP protocol, for example.

If a password has not been set, the default password provided in a notification_sm can be required to be initialized prior to the subscriber accessing the voicemail box, setting the greeting, or setting a recorded name. If the password has not been initialized, the VMS 102 can send the current password in a notification_sm message. The current password can be used to access the voicemail box to configure the new password. The password can be any combination of numbers and/or characters and can be any length. The password can be set with a minimum and maximum length. The VVM application can be configured to verify that the password complies with this requirement prior to attempting to change the password on the VMS 102. The password can be set with a minimum or maximum amount of numbers and/or characters. The VVM application can be configured to verify that the password complies with this requirement prior to attempting to change the password on the VMS 102. Other requirements can be established. If the subscriber enters a password that fails to comply with any requirement, the VVM application can notify the user to retry with a password that satisfies the requirement(s), offer customer support, and/or refer the customer to a telephone number or website address for further information and troubleshooting.

The illustrated process 400 begins when the subscriber is prompted to enter both the old password and the new password. The MD 118 can establish a secure session using, for example, SSL or TLS, via a secure handshake process 212, as described above in FIG. 2, so that any password sent between the MD 118 and the VMS 102 is encrypted.

At step 402, the subscriber can enter the old password and new password on the MD 118. After the passwords have been entered, the VVM application can generate a change_password_request. The change_password_request can be sent to the VMS 102 for storage, at step 404. The VMS 102 can perform a password validation and save the new password. At step 406, the VMS 102 can generate and send a change_password_response to report the success or failure of the change_password_request. Error codes can be set for the VMS 102 to return to the MD 118 in case the password is found invalid for any reason or if the password has expired. The VVM application can be configured to receive an error code and provide corrective action to the subscriber to resolve the password issue. For example, the VVM application can notify the user to retry, offer customer support, and/or refer the customer to a telephone number or website address for further information and troubleshooting.

Figure 5:
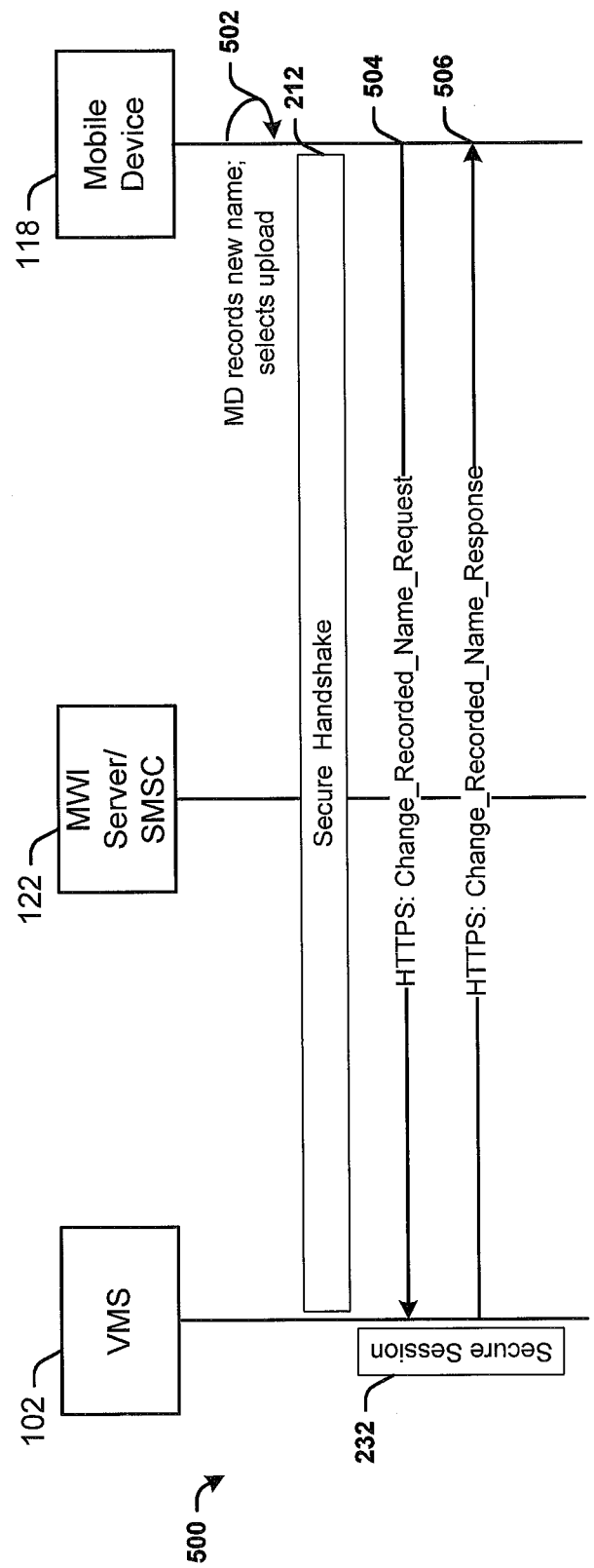
FIG. 5 is a message flow diagram illustrating a secure process for setting or changing a recorded name, according to an exemplary embodiment of the present disclosure.

Referring now to FIG. 5, a message flow diagram illustrating a secure process for setting or changing a recorded name is illustrated, according to an exemplary embodiment of the present disclosure. It should be understood that the steps of the process 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated process 500 can be ended at any time. Some or all steps of this process, and/or substantially equivalent steps, can be performed by execution of computer-readable instructions included on a computer readable medium.

The process 500 is illustrated as including the VMS 102, the SMSC 122, and the MD 118. In the illustrated process 500, various messages and/or commands are exchanged among these network elements using various protocols, such as, for example, HTTPS, although other protocols are contemplated as described above. The process 500 can be modified to include other network elements, such as the CDS 104. In one embodiment, CDS 104 acts in an intermediary capacity, facilitating communication between the MD 118 and the VMS 102. The CDS 104 can communicate with the VMS 102 via the IMAP protocol, for example.

The process 500 can begin when a subscriber records a new name on the MD 118, at step 502. The subscriber can then select an upload function on the VVM application to upload the new name. The recorded name can be formatted using any audio codec, such as, but not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4), Windows® media audio (WMA), RealAudio (RA), free lossless audio codec (FLAC), Apple® lossless encoder (ALE), i.e., Apple® lossless audio codec (ALAC), and other open and proprietary audio formats.

The MD 118 can establish a secure session using, for example, SSL or TSL, via a secure handshake process 212, as described above in FIG. 2, so that any password sent between the MD 118 and the VMS 102 is encrypted.

After a new name has been recorded, the VVM application can generate a change_recorded_name_request containing the recorded name in the selected format, at step 504. The VMS 102 can receive the change_recorded_name_request and save the new recorded name. The VMS 102 can generate a change_recorded_name_response to report the success or failure of the save and send the change_recorded_name_response to the MD 118, at step 506.

The VVM application can be configured to switch between the standard greeting without name, the standard greeting with name, and a custom greeting. The standard greeting can be, for example, a greeting provided by the VM service provider as a default with or without the recorded name. The VVM application can be further configured to retrieve the current voicemail greeting and recorded name using a HTTP request.

Figure 6:
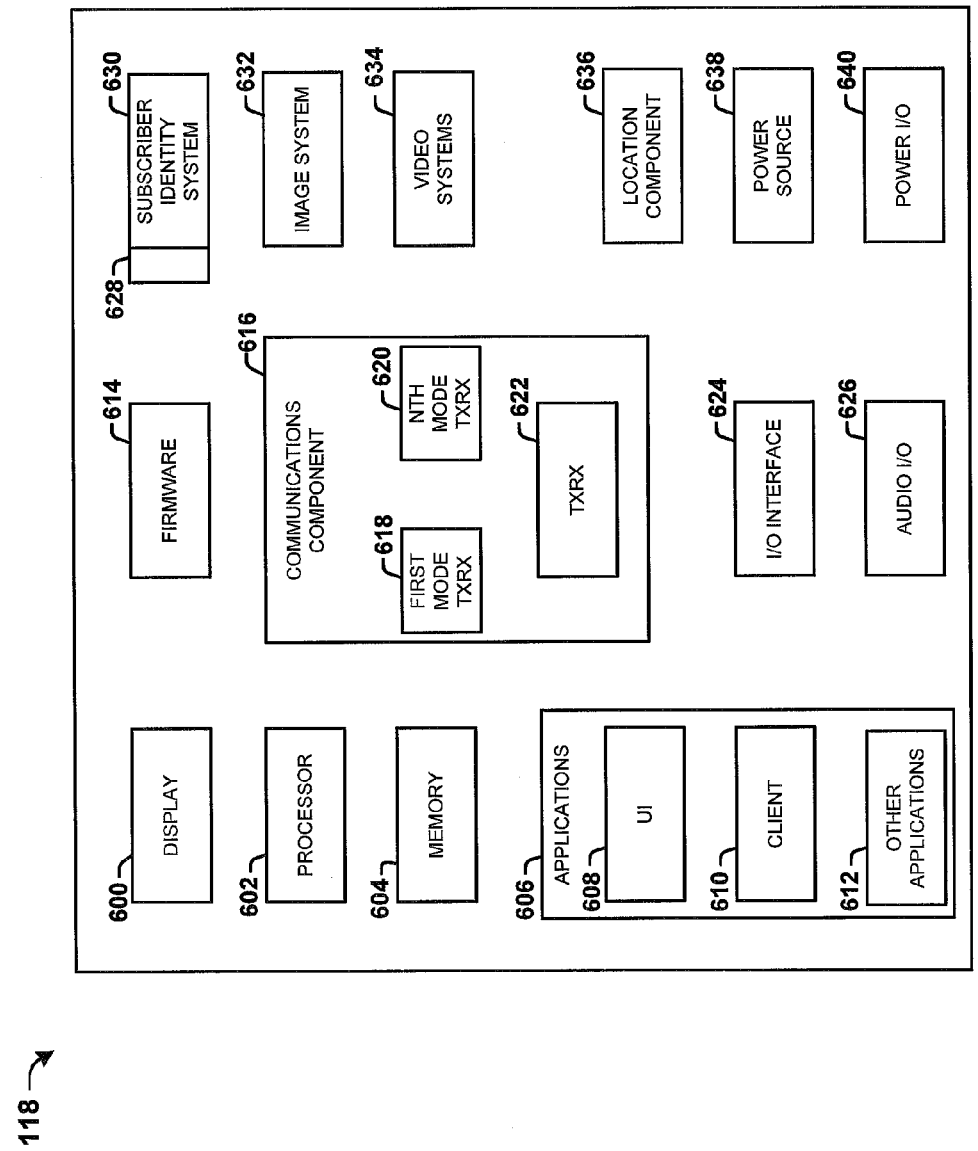
FIG. 6 schematically illustrates an exemplary mobile device and components thereof for use in accordance with an embodiment of the present disclosure.

FIG. 6 is a schematic block diagram illustrating an exemplary mobile device 118 for use in accordance with an exemplary embodiment of the present disclosure. Although no connections are shown between the components illustrated and described in FIG. 6, the components can interact with each other to carry out device functions.

As illustrated, the mobile device 118 can be a multimode handset. FIG. 6 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The illustrated device 118 includes a display 600 for displaying multimedia, such as, for example, text, images, video, telephony functions, such as, visual voicemail data, caller line ID data, setup functions, menus, music metadata, messages, wallpaper, graphics, and the like. The display 600 finds particular application in the present disclosure for displaying visual voicemail data in visual voicemail headers. The visual voicemail headers can include the date, time, CLI data, message length, and message status (i.e., new-unread, read, saved, or deleted).

The device 118 can include a processor 602 for controlling, and/or processing data. A memory 604 can interface with the processor 602 for the storage of data and/or applications 606. The memory 604 can include a variety of computer readable media, including volatile media, non-volatile media, removable media, and non-removable media. Computer-readable media can include device storage media and communication media. Storage media can include volatile and/or non-volatile, removable and/or non-removable media, such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 118.

The memory 604 can be configured to store one or more applications 606. The applications 606 can include a user interface (UI) application 608. The UI application 608 can interface with a client 610 (e.g., an operating system) to facilitate user interaction with device functionality and data, for example, managing voicemails in a visual voicemail application, answering/initiating calls, entering/deleting data, configuring settings, address book manipulation, multimode interaction, and the like. The applications 606 can include other applications 612 such as, for example, visual voicemail software, add-ons, plug-ins, voice recognition software, call voice processing, voice recording, messaging, e-mail processing, video processing, image processing, music play, combinations thereof, and the like, as well as subsystems and/or components. The applications 606 can be stored in the memory 604 and/or in a firmware 614, and can be executed by the processor 602. The firmware 614 can also store code for execution during initialization of the device 118.

A communications component 616 can interface with the processor 602 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 616 can also include a multimode communications subsystem for providing cellular communications via different cellular technologies. For example, a first cellular transceiver 618 can operate in one mode, for example, GSM, and an Nth transceiver 620 can operate in a different mode, for example WiFi. While only two transceivers 618, 620 are illustrated, it should be appreciated that a plurality of transceivers can be included. The communications component 616 can also include a transceiver 622 for unlicensed RF communications using technology such as, for example, WiFi, WiMAX, NFC, other RF and the like. The transceiver 622 can also be configured for line-of-sight technologies, such as, for example, infrared and IRDA. Although a single transceiver 622 is illustrated multiple transceivers for unlicensed RF and line-of-sight technologies are contemplated.

The communications component 616 can also facilitate communications reception from terrestrial radio networks, digital satellite radio networks, Internet-based radio services networks, combinations thereof, and the like. The communications component 616 can process data from a network, such as, for example, the Internet, a corporate intranet, a home broadband network, and the like, via an ISP, DSL provider, or other broadband service provider.

An input/output (I/O) interface 624 can be provided for input/output of data and/or signals. The I/O interface 624 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 626 that can include a speaker (not shown) for the output of audio signals and a microphone (not shown) to collect audio signals.

The device 118 can include a slot interface 628 for accommodating a subscriber identity system 630, such as, for example, a SIM or universal SIM (USIM). The subscriber identity system 630 instead can be manufactured into the device 118, thereby obviating the need for a slot interface 628.

The device 118 can include an image capture and processing system 632. Photos and/or videos can be obtained via an associated image capture subsystem of the image system 632, for example, a camera. The device 118 can also include a video systems component 634 for processing, recording, and/or transmitting video content.

A location component 636 can be included to send and/or receive signals, such as, for example, GPS data, assisted GPS data, triangulation data, combinations thereof, and the like. The device 118 can use the received data to identify its location or can transmit data used by other devices to determine the device 118 location.

The device 118 can include a power source 638 such as batteries and/or other power subsystem (AC or DC). The power source 638 can be single-use, continuous, or rechargeable. In the case of the latter, the power source 638 can interface with an external power system or charging equipment via a power I/O component 640.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for managing incoming voicemail messages at a visual voicemail system, the method comprising:
    receiving, at the visual voicemail system, a new voicemail message for a voicemail account associated with a mobile device;
    in response to receiving the new voicemail message, generating, by the visual voicemail system, a deposit notification message that is directed to the mobile device to inform the mobile device that the new voicemail message is available for download;
    sending, by the visual voicemail system, the notification message to the mobile device;
    completing, by the visual voicemail system, establishment of a secure data session with the mobile device, wherein establishment of the secure data session is initiated by the mobile device in response to the deposit notification message;
    receiving, at the visual voicemail system during the secure data session, a request from the mobile device, the request being for voicemail message header information in response to the deposit notification message;
    sending, by the visual voicemail system, the voicemail message header information to the mobile device during the secure data session in response to the request, wherein the mobile device is configured to utilize the voicemail message header information to determine a status for each voicemail message stored on the mobile device and to identify, based upon the status for each voicemail message stored on the mobile device, the new voicemail message;
    receiving, at the visual voicemail system during the secure data session, a request for at least the new voicemail message; and
    sending, by the visual voicemail system, at least a portion of the new voicemail message to the mobile device during the secure data session in response to the request for the at least the new voicemail message.

2. The method of claim 1, wherein the secure data session established between the visual voicemail system and the mobile device comprises a secure sockets layer data session.

3. The method of claim 1, wherein the secure data session established between the visual voicemail system and the mobile device comprises a transport layer security data session.

4. A method for managing voicemails from a mobile device, the method comprising:
    receiving, at the mobile device, a deposit notification message, the deposit notification message being directed to the mobile device by a visual voicemail system to inform the mobile device that a new voicemail message has been deposited into a voicemail account associated with the mobile device and that the new voicemail message is available for download;
    in response to receiving the deposit notification message, initiating, by the mobile device, establishment of a secure data session with the visual voicemail system;
    in response to receiving the deposit notification message, generating, by the mobile device, a request for voicemail header information;
    sending, by the mobile device, the request for voicemail header information to the visual voicemail system during the secure data session;
    receiving, at the mobile device during the secure data session, the voicemail message header information;
    utilizing, by the mobile device, the voicemail message header information to determine a status for each voicemail message that is stored on the mobile device and to identify, based upon the status for each voicemail message stored on the mobile device, the new voicemail message;

generating, by the mobile device, a request for at least the voicemail message identified in the voicemail message header information;

sending, by the mobile device, the request for at least the voicemail message to the visual voicemail system during the secure data session; and receiving, at the mobile device during the secure data session, at least a portion of the voicemail message.

5. The method of claim 4, wherein the secure data session established between the visual voicemail system and the mobile device comprises a secure sockets layer data session.

6. The method of claim 4, wherein the secure data session established between the visual voicemail system and the mobile device comprises a transport layer security data session.

7. The method of claim 4 further comprising:
saving the portion of the voicemail message at least temporarily in a memory of the mobile device.

8. A mobile device comprising:
a processor; and
a memory comprising computer-executable instructions that, when executed by the processor, cause the processor to perform operations comprising
receiving a deposit notification message, the deposit notification message being directed to the mobile device by a visual voicemail system to inform the mobile device that a new voicemail message has been deposited into a voicemail account associated with the mobile device and that the new voicemail message is available for download;
in response to receiving the deposit notification message, initiating establishment of a secure data session with the visual voicemail system;
in response to receiving the notification message, generating a request for voicemail header information;
sending the request for voicemail header information to the visual voicemail system during the secure data session established between the visual voicemail system and the mobile device;
receiving the voicemail message header information during the secure data session;
utilizing the voicemail message header information to determine a status for each voicemail message that is stored on the mobile device and to identify, based upon the status for each voicemail message stored on the mobile device, the new voicemail message;
generating a request for at least the voicemail message identified in the voicemail message header information;
sending the request to the visual voicemail system during the secure data session; and
receiving at least a portion of the voicemail message during the secure data session.

9. A non transitory computer-readable storage medium comprising computer-executable instructions that, when executed by a processor of a visual voicemail system, cause the processor to perform operations comprising:
receiving a new voicemail message for a voicemail account associated with a mobile device;
in response to receiving the new voicemail message, generating a deposit notification message that is directed to the mobile device to inform the mobile device that the new voicemail message is available for download;
sending the deposit notification message to the mobile device;
completing establishment of a secure data session with the mobile device, wherein establishment of the secure data session is initiated by the mobile device in response to the deposit notification message;
receiving, during the secure data session, a request from the mobile device, the request being for voicemail message header information in response to the deposit notification message;
sending the voicemail message header information to the mobile device during the secure data session in response to the request, wherein the mobile device is configured to utilize the voicemail message header information to determine a status for each voicemail message stored on the mobile device and to identify, based upon the status for each voicemail message stored on the mobile device, the new voicemail message;
receiving, during the secure data session, a request for at least the new voicemail message; and
sending at least a portion of the new voicemail message to the mobile device during the secure data session in response to the request for at least the new voicemail message.

10. A visual voicemail system comprising:
a processor; and
a memory comprising computer-executable instructions that, when executed by the processor, cause the processor to perform operations comprising
receiving a new voicemail message for a voicemail account associated with a mobile device;
in response to receiving the new voicemail message, generating a deposit notification message that is directed to the mobile device to inform the mobile device that the new voicemail message is available for download;
sending the deposit notification message to the mobile device;
completing establishment of a secure data session with the mobile device, wherein establishment of the secure data session is initiated by the mobile device in response to the deposit notification message;
receiving, during the secure data session, a request from the mobile device, the request being for voicemail message header information in response to the deposit notification message;
sending the voicemail message header information to the mobile device during the secure data session in response to the request, wherein the mobile device is configured to utilize the voicemail message header information to determine a status for each voicemail message stored on the mobile device and to identify, based upon the status for each voicemail message stored on the mobile device, the new voicemail message;
receiving, during the secure data session, a request for at least the new voicemail message; and
sending at least a portion of the new voicemail message to the mobile device during the secure data session in response to the request for at least the new voicemail message.

11. The mobile device of claim 8, wherein the secure data session established between the visual voicemail system and the mobile device comprises a secure sockets layer data session.

12. The mobile device of claim 8, wherein the secure data session established between the visual voicemail system and the mobile device comprises a transport layer security data session.

13. The mobile device of claim 8, wherein the memory further comprises computer-executable instructions that, when executed by the processor, cause the processor to perform further operations comprising saving the portion of the voicemail message at least temporarily in the memory of the mobile device.

14. The non transitory computer-readable storage medium of claim 9, wherein the secure data session established between the visual voicemail system and the mobile device comprises a secure sockets layer data session.

15. The non transitory computer-readable storage medium of claim 9, wherein the secure data session established between the visual voicemail system and the mobile device comprises a transport layer security data session.

16. The visual voicemail system of claim 10, wherein the secure data session established between the visual voicemail system and the mobile device comprises a secure sockets layer data session.

17. The visual voicemail system of claim 10, wherein the secure data session established between the visual voicemail system and the mobile device comprises a transport layer security data session.

\* \* \* \* \*